Patented May 31, 1932

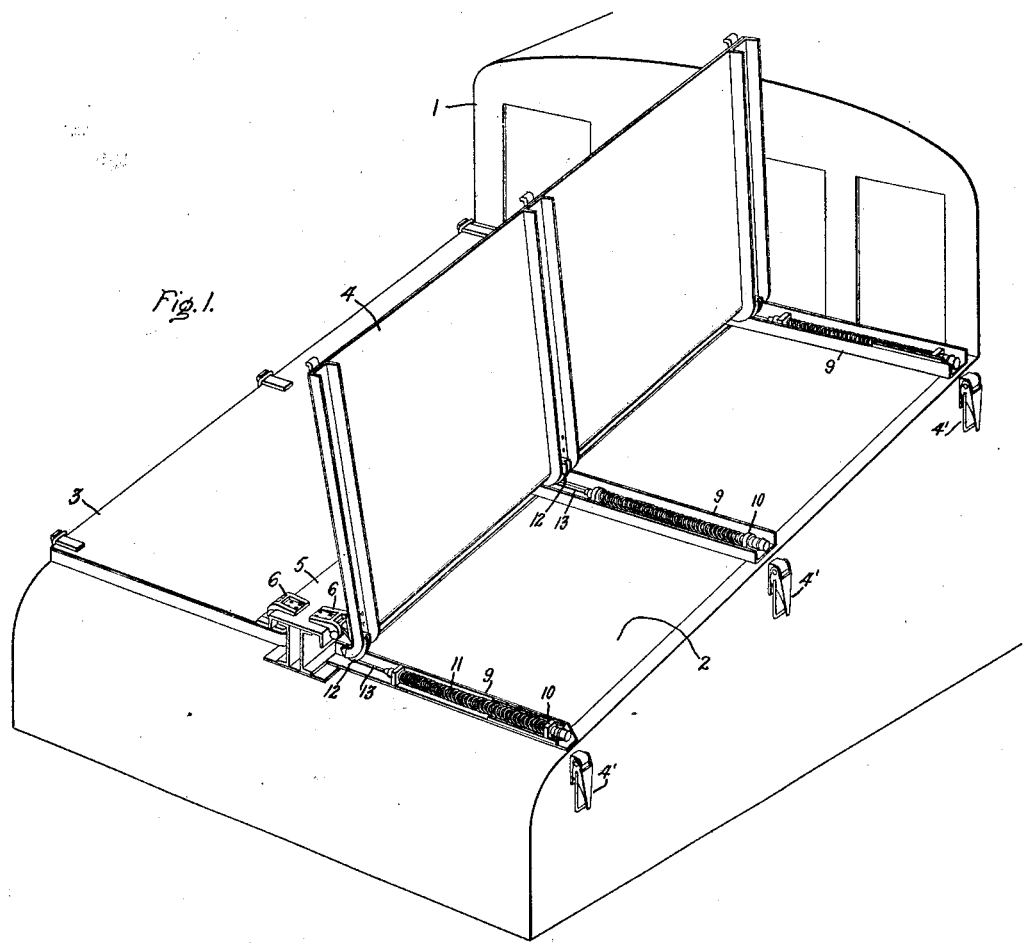
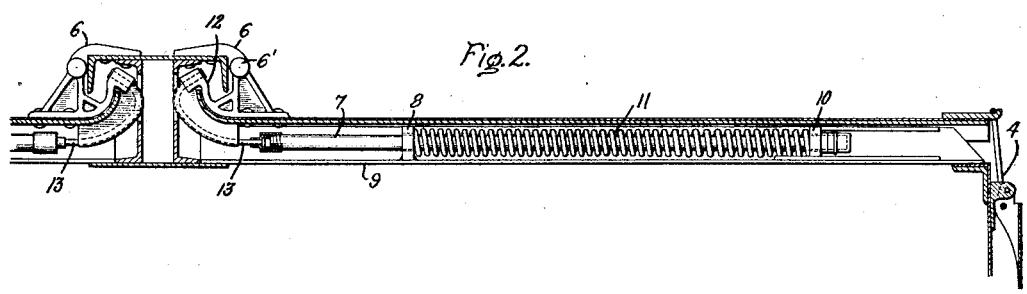

1,861,277

UNITED STATES PATENT OFFICE

OLE K. KJOLSETH, OF ERIE, PENNSYLVANIA, ASSIGNOR TO GENERAL ELECTRIC COMPANY, A CORPORATION OF NEW YORK

DOOR COUNTERBALANCING STRUCTURE

Application filed September 11, 1929. Serial No. 391,950.

My invention relates to a door counterbalancing structure, and more particularly to hatch covers of comparatively large and heavy construction.

When a hatch cover of large size and mass, as of the type used for closing a storage compartment of an electric locomotive for example, is moved to either its open or closed position by an operator, there is present a risk that the hatch cover, which is generally constructed of metal as steel, may get out of control of the operator and fall into its closed position with considerable force and impact, thereby possibly causing injury to the operator unless provided with means for opposing the closing movement thereof. Furthermore, it is desirable that means be provided for assisting the operator in opening the heavy hatch cover and for counterbalancing the weight thereof so that there is not, to any appreciable extent at least, a tendency of the hatch cover by itself to close.

It is a principal object of my invention to provide improved means for either partially or completely balancing the weight of a comparatively heavy closure structure, as a hatch cover, so that movement thereof by an operator may be effected with a small amount of effort and with a high degree of safety.

My invention will be more fully set forth in the following description referring to the accompanying drawings, and the features of novelty which characterize my invention will be pointed out with particularity in the claims annexed to and forming a part of this specification.

Referring to the drawings, Fig. 1 is a partial view of the body structure of an electric locomotive embodying my invention, and Fig. 2 is a sectional view of closure structure illustrated in Fig. 1.

My invention is illustrated as applied to an electric locomotive by way of example, and more particularly to the hatch covers for the storage compartments usually employed for storage batteries or other equipment.

Referring to Fig. 1, the body structure 1 of the locomotive is provided with a storage compartment 2 at one end, having the hatch covers 3 and 4 which are pivoted above and along the mid-section of the compartment. The pivotal mounting for the hatch covers is disposed along an axis which is inclined with respect to the vertical and comprises an I-beam structure 5 mounted across the top mid-section of the compartment and having secured thereto in any suitable manner the hinge members 6 for supporting the hatch covers. The hinges 6 have their pivots 6' considerably offset with respect to the hatch covers so that the covers are suspended therefrom. Latching means 4' of any suitable type are provided for securing the covers in their closed positions.

Due to the fact that the hatch covers in the present instance are constructed of heavy metal plate, it will be apparent that an operator must exert considerable effort in opening the same for inspection or other purposes, and in so doing the cover might slip from his hands and close with considerable impact, thereby possibly directly or indirectly causing injury to him, as by causing him to lose his balance and fall from the locomotive.

In order to prevent the hatch covers from getting out of control of the operator and to assist him in the operation thereof, there is provided counter-balancing means tending to assist in the opening movement of the hatch cover, and to resist its closing movement. The counterbalancing means for each hatch cover comprise a plurality of rods 7 each guided for longitudinal movement along the top of the compartment by means of a stationary guide or lug 8 disposed within an angle member 9 forming part of the compartment structure and extending transversely across the top thereof. The rod 7 is provided at its outer or free end with a lug or shoulder 10 which likewise serves as a cross-head to guide the free end of the rod and forms a seat for one end of a helical spring 11 whose other end bears against the stationary lug 8.

As more clearly illustrated in Fig. 2, the hinge 6 is offset and mounted above the hatch cover 4 for supporting the same, and comprises an offset depending portion 12 to which is connected a flexible member 13, as a cable, whose other end is connected to the rod 7. The tension of the spring 11 is adjusted so as to urge the guided rod 7 towards the right, thereby placing the cable 13 under tension and tending to rotate the hinge of the hatch cover in a counter-clockwise or opening direction. The cross-head member 10 may obviously be adjusted in any suitable manner along the rod 7 to vary the tension of spring 11 for insuring sufficient force to suitably counter-balance the hatch cover.

In operation, the usual latching means 4' for holding the hatch cover closed are released and the operator has simply to overcome an initial force representative of the difference in weight of the hatch cover and the tension of the spring 11. When, however, the hatch cover has been moved partly open, the effect of the spring 11 becomes more pronounced and may complete the opening movement by itself. During the closing movement there is no danger of the hatch cover getting out of control of the operator since it is moved an appreciable distance towards closed position before the operator finds it necessary to exert an appreciable, if any, restraining force. Accordingly, operation of a hatch cover may be performed with comparative safety by an operator even during normal operation of the locomotive, since he may devote more of his attention to his own security rather than struggle with the massive hatch cover.

It shall be understood that my invention is not limited to the specific details of construction herein illustrated, nor is its application specifically limited to electric locomotives, but reasonable modifications in the structure thereof may be made without departing from the spirit of my invention.

What I claim as new and desire to secure by Letters Patent of the United States, is:

1. A compartment and pivoted cover therefor, means for counterbalancing said cover so as to assist in the opening thereof and to prevent sudden closure comprising a rod arranged beneath said cover and guided for longitudinal movement, a flexible cable connecting said rod to said cover, and a spring coacting with said rod for placing said cable under tension so as to assist opening movement of the cover.

2. A storage compartment, a pivoted cover therefor, means for counterbalancing the weight of said cover, comprising a plurality of rods individually guided on members forming part of said compartment, a plurality of hinge members mounted above said cover and supporting the same, flexible cables each connected between a rod and an offset portion of a hinge, and springs coacting with said rods for urging them longitudinally so as to place said cables under tension, thereby tending to produce opening movement of the cover.

In witness whereof, I have hereunto set my hand this 9th day of September, 1929.

OLE K. KJOLSETH.